(12) United States Patent
Van Coppenolle et al.

(10) Patent No.: US 7,672,810 B2
(45) Date of Patent: Mar. 2, 2010

(54) METHOD, DEVICE AND COMPUTER PROGRAM FOR EVALUATING AN OBJECT USING A VIRTUAL REPRESENTATION OF SAID OBJECT

(75) Inventors: Bart Van Coppenolle, Linden (BE); Lieven De Jonge, Overijse (BE)

(73) Assignee: 3D Scanners Ltd., Derby (GB)

( * ) Notice: Subject to any disclaimer, the term of this patent is extended or adjusted under 35 U.S.C. 154(b) by 0 days.

(21) Appl. No.: 10/576,223

(22) PCT Filed: Oct. 14, 2004

(86) PCT No.: PCT/EP2004/011540

§ 371 (c)(1),
(2), (4) Date: Apr. 14, 2006

(87) PCT Pub. No.: WO2005/040944

PCT Pub. Date: May 6, 2005

(65) Prior Publication Data

US 2007/0032901 A1 Feb. 8, 2007

(30) Foreign Application Priority Data

Oct. 15, 2003 (EP) .................................. 03447253

(51) Int. Cl.
*G06F 3/01* (2006.01)
(52) U.S. Cl. ........................ 702/182; 702/179; 702/183; 702/186
(58) Field of Classification Search .................. 702/94, 702/95, 151–153, 168, 176, 179, 182, 183, 702/186; 382/285; 700/86, 169; 713/186; 726/30; 345/420; 725/30
See application file for complete search history.

(56) References Cited

U.S. PATENT DOCUMENTS

| | | | | | |
|---|---|---|---|---|---|
| 4,662,074 | A | * | 5/1987 | Knapp et al. | 33/701 |
| 4,819,195 | A | * | 4/1989 | Bell et al. | 702/95 |
| 5,291,393 | A | * | 3/1994 | Matsumoto et al. | 700/86 |
| 6,012,022 | A | * | 1/2000 | Michiwaki | 702/168 |
| 6,131,299 | A | * | 10/2000 | Raab et al. | 33/503 |
| 6,400,998 | B1 | * | 6/2002 | Yamazaki et al. | 700/86 |
| 6,697,948 | B1 | * | 2/2004 | Rabin et al. | 726/30 |
| 6,804,575 | B2 | * | 10/2004 | Sagawa et al. | 700/181 |
| 6,935,036 | B2 | * | 8/2005 | Raab et al. | 33/503 |
| 6,954,680 | B2 | * | 10/2005 | Kreidler et al. | 700/169 |
| 2002/0114537 | A1 | * | 8/2002 | Sutula, Jr. | 382/285 |

* cited by examiner

*Primary Examiner*—Eliseo Ramos Feliciano
*Assistant Examiner*—Felix E Suarez
(74) *Attorney, Agent, or Firm*—Marshall, Gerstein & Borun LLP (57) ABSTRACT

The present invention relates to a method for evaluating an object by reading and commands of a macro normally used in measurement equipment for evaluating a physical object, and applying said commands to a numerical (virtual) representation of a physical object. Said method provides a evaluation of the physical object, by applying said macro to a virtual representation of said object.

41 Claims, 3 Drawing Sheets

FIGURE 3

METHOD, DEVICE AND COMPUTER PROGRAM FOR EVALUATING AN OBJECT USING A VIRTUAL REPRESENTATION OF SAID OBJECT

FIELD OF THE INVENTION

The present invention relates to a method, device and computer program for evaluating a physical object.

BACKGROUND OF THE INVENTION

For the industrial dimensional control of produced parts or prototypes, different types of measurement equipment is used. Some equipment, such as microscopes or profile projectors, takes measures of the part without physically touching it, using a non-contacting technique. Other equipment, such as dial gauges or Coordinate Measuring Machines (CMMs), actually touch the part while taking the measurements.

All this equipment can also be divided in another way: manual, motorized or Computer Numerical Controlled (CNC):

1. Manual equipment requires the user to manually make the measurement by physically handling the equipment and the part during the measurement.
2. Motorized equipment uses motors controlled by the user to displace certain parts of the equipment in order to make the measurement on the part in consideration.
3. In CNC equipment there are also motors that drive parts of the equipment for performing the measurement, but instead of a single displacement controlled by the user, a sequence of displacements can be carried out by the equipment for performing multiple measurements. This sequence is performed under the direction of a measurement program or macro. A macro consists generally of displacement commands, point measurement commands and feature (e.g. plane, slot, hole, etc) calculation and evaluation (i.e. comparison with the nominal value) commands. The macro is built by the user beforehand and can be repeated an indefinite number of times on the same part or on a (quite) similar part. During the execution of the macro the measurement equipment runs autonomously, but the part being measured remains physically present in the measurement equipment.

Certain measurement equipment can be a combination of manual, motorized and/or CNC.

Three-dimensional control in industry is mostly carried out by CMMs, because of their flexibility and accuracy. All CNC-CMMS have the capability of building and executing macros, and are widely used and standardized in industry. The industry standard language for these macros is DMIS (Dimensional Measuring Interface Standard). Macros for most industrial parts have been written in the last 20 years. Macros specific for parts would also be available within the company manufacturing these parts.

Unfortunately, the measurement equipment is expensive, slow, but a vital part of the ISO 9002 systems of their users.

The macros can be created in two different ways:

1. Teach-in method: The user controls the movements and actions (e.g. taking measurements) of the measurement equipment. Each movement and action is recorded on to a storage medium, ultimately as a macro so the measurement equipment can re-perform these any number of times by reading the macro. In addition to recording movements and actions, the macro may be programmed to perform mathematical computations on the results of the measurements such as 'compute a circle through the 3 measured points' or 'compare the diameter of the computed circle with a certain value'. Thus, a sequence of displacements, measurements, computations and comparisons constitute the macro.
2. Off-line method: Using the part drawings of the object or feature on paper, or using the Computer Aided Design (CAD) model of the part, the user can manually build a macro by writing down the sequence of macro commands. The displacements, measurements, computations and comparisons, the equipment has to carry out derived therefrom constitute the macro.

Although macros can be written as described above, it is an advantage for a manufacturer to also be able to use a macro from the library of prewritten macros, since creating a macro can be time consuming and technically demanding.

Each time the macro is executed, the part being measured has to be physically present in the measurement equipment. This requirement has some organisational and financial drawbacks as follows.

1. Measurement equipment availability: The high expense of precision engineered measurement equipment means often a parts manufacture will have a minimum number of measurement equipment devices, which are kept in constant operation often to a strict schedule. If, once in receipt of evaluation of the macro measurements results, other measurements are deemed necessary, space has to be found in the machine-time schedule to re-measure the part. This might require a substantial delay, and disruption to the schedule which has financial repercussions.
2. Communication in a world wide production environment: The manufacturer of a physical object might be located in a part of the world that is far from the client who specified the dimensions of the part. If there is a quality control issue with the part, the part has to be shipped back to the manufacturer for further analysis where the measurement equipment for evaluation is usually sited. The shipping and remeasuring causes substantial delays to the client, and the delays might have cost implications.

It is an aim of the invention to provide a method and device that enables a physical object to be evaluated wherein neither the physical object, nor measurement equipment capable of evaluating a physical object are required to be present during evaluation. It is a further aim to that the method and device take advantage of the substantial archive of macros that is available now and in the future to automate the evaluation of the object.

SUMMARY OF THE INVENTION

An embodiment of the present invention is a method for evaluating a physical object comprising the steps of:
reading the instructions of a macro,
said macro suitable for use with measurement equipment capable of performing measurements of a physical object,
said macro comprising instructions for said equipment to perform an evaluation of a physical object,
performing the instructions of said macro upon a numerical representation of the surface of said object, and
obtaining from the results of the macro, an evaluation of the physical object.

Another embodiment of the present invention is a method as described above wherein said numerical representation of the surface is obtained by scanning part or all of the physical object using an object scanner.

Another embodiment of the present invention is a method as described above wherein said numerical representation of the surface is any of point cloud data, triangulated mesh data, rendered surface data, or polyline data.

Another embodiment of the present invention relates to a method as described above wherein said measurement equipment is a Coordinate Measuring Machine, CMM.

Another embodiment of the present invention relates to a method as described above wherein said macro comprises Dimensional Measuring Interface Standard, DMIS, commands.

Another embodiment of the present invention relates to a method as described above wherein said macro comprises CMM commands.

Another embodiment of the present invention relates to a method as described above whereby said evaluation is communicated by part of a DMIS-measurement program or by using DMIS commands format.

Another embodiment of the present invention relates to a method as described above hereby the said evaluation is communicated in the format of CMM measurement results.

Another embodiment of the present invention relates to a method as described above wherein the instructions of said macro that are performed relate to the measurement of data from the numerical representation of the surface.

Another embodiment of the present invention relates to a method as described above wherein translations through the surface of the object may be performed by the method.

Another embodiment of the present invention relates to a method as described above wherein a measurement comprises the steps of:
(a) determining those elements of data numerically representing the object, that correspond to the position on the physical object to be measured, without increasing the resolution by calculating the co-ordinates of any additional points,
(b) calculating by interpolation of the elements determined in step (a) additional points in the area of the position to be measured, so increasing the resolution therein,
(c) calculating from the higher-resolution area determined in step (b) a measurement of the object.

Another embodiment of the present invention relates to a method as described above wherein one or more instructions of said macro have been created by using said numerical representation of the physical object.

Another embodiment of the present invention relates to a method as described above wherein said instructions are recorded to the macro by way of a DMIS-measurement program or using the DMIS commands format.

Another embodiment of the present invention relates to a method as described above wherein said instructions are part of a measurement sequence generated by recording commands of a Coordinate Measuring Machine measurement program.

Another embodiment of the present invention relates to a method as described above in which the said instructions are part of a measurement sequence in a Coordinate Measuring Machine measurement program.

Another embodiment of the present invention relates to a method as described above wherein said evaluation comprises the execution of steps on a computer in an automatic way without interaction with the user of said computer during the execution of the said steps:

Another embodiment of the invention relates to a method for virtually measuring an object using a cloud of points virtually representing the said object and calculating the value or values that approximates the value or values that would result from the measurement of the said object by a measuring device.

Another embodiment of the invention relates to a method for virtually probing an object using a cloud of points virtually representing the said object and calculating or selecting the point that approximates the point that would result from the probing of a CMM on the said object.

Another embodiment of the invention relates to a computer program stored on a computer readable medium capable of performing the method as described above.

Another embodiment of the invention relates to a computer program as described above further comprising the ability to receive a numerical representation of the physical object from a remote computer.

Another embodiment of the present invention relates to a computer as described above wherein the numerical representation is received from the remote computer across any of the Internet, email, wireless link, public switched telephone network, ISDN, satellite link, or by physical transport of a computer readable storage medium holding said numerical representation.

Another embodiment of the invention relates to a computer program as described above wherein said computer readable storage medium is any of optical disk, magnetic disk, optic-magnetic disk, magnetic tape.

Another embodiment of the present invention relates to a computer program as described above, further the comprising the ability to display a user interface on a web browser of a remote computer connected to the Internet, said interface allowing a user to send a numerical representation of the physical object over the Internet to said method.

Another embodiment of the present invention relates to a computer program as described above further comprising the ability to display a user interface on a web browser of a remote computer connected to the Internet, said interface allowing a user to send said macro over the Internet to said method.

Another embodiment of the present invention relates to a computer program as described above further comprising the ability to display a user interface on a web browser of a remote computer connected to the Internet, said interface allowing a user to send the title of said macro or an indication thereof over the Internet to said method.

Another embodiment of the invention further relates to a computer program as described above further comprising the ability to display a user interface on a web browser of a remote computer connected to the Internet, said interface allowing a user to receive an evaluation report of a physical object generated by said method.

Another embodiment of the present invention further relates to a computer program as described above, further comprising the ability to display a pay-per-use interface on a web browser of a remote computer connected to the Internet, said pay-per-use interface capable of one or more of the following:
(a) requesting and/or providing a username and password to the remote computer user, to enable a user to access an account for using the method,
(b) requesting billing information of the remote computer user,
(c) indicating a billing amount to the remote computer user, relating to the number of evaluations performed.

Another embodiment of the present invention further relates to a device capable of performing a method as described above.

Another embodiment of the present invention further relates to a device capable of performing a method as described above comprising,
  means for reading the instructions of a macro,
  said macro suitable for use with measurement equipment capable of performing measurements of a physical object,
  said macro comprising instructions for said equipment to perform an evaluation of a physical object,
  means for performing the instructions of said macro upon a numerical representation of the surface of said object, and
  means for obtaining from the results of the macro, an evaluation of the physical object.

A device as described above, that is a piece of measurement equipment capable of performing measurements of a physical object.

Another embodiment of the present invention further relates to a piece of measurement equipment capable of performing measurements of a physical object, capable of performing a method as described above.

Another embodiment of the present invention further relates to a piece of measurement equipment as described above wherein said equipment is a CMM.

DETAILED DESCRIPTION OF THE INVENTION

The invention relates to a method of evaluating a physical object by applying a measurement equipment macro to a numerical representation of the object.

One embodiment of the present invention is a method for evaluating a physical object comprising the steps of
  reading the instructions of a macro,
    said macro suitable for use with measurement equipment capable of performing one or more measurements of a physical object,
    said macro comprising instructions for performing an evaluation of a physical object,
  performing the instructions of said macro upon a numerical representation of the surface of said object, and
  obtaining from the results of the macro an evaluation of the physical object.

The instructions of the macro are performed by a method of the invention upon a numerical representation of the object. For example, the macro might normally instruct the measurement equipment to touch the physical object from a particular direction and take a co-ordinate measurement therefrom. The method performs the same measurement without the use of measurement equipment or physical object, by obtaining the same co-ordinate measurements from the same direction, in respect of the numerical representation of the physical object.

By executing the macro on the numerical representation of the physical object, the presence of the measurement equipment is not necessary and, therefore, displacements of the parts by the equipment (e.g. displacements of robot arms) are not physically carried out and are unnecessary. The evaluation of the physical object by the macro is, therefore, carried out virtually. According another aspect of the invention, said method may be performed by a computer program stored on a computer readable medium. The instructions of the macro are interpreted and applied to the numerical representation of the physical object.

Evaluating a physical object means obtaining information regarding the shape of a portion, a whole and/or feature (e.g. a hole, a groove, a protrusion) of a physical object. Such information provides a user with an assessment of, for example, the trueness of a circular hole, the trueness of a square groove, the dimensions of the object etc.

Measurement equipment that is capable of performing an evaluation of the object is known in the art. Measurement equipment usually comprises a probe that measures the object and a means to move the probe, such as, for example, a robot arm. The measurement equipment may be programmable. Examples include, but are not limited to, measuring devices that touch the physical object such as CMMs, dial gauges and measuring devices that does not touch the physical object such as microscopes or profile projectors.

According to the invention, macros are any macros that instruct a piece of measurement equipment capable of measuring an object, to perform an evaluation of the object. It is another aspect of the invention that the macro would directly instruct a piece of measurement equipment. It is a further aspect of the invention that a macro contains one or more commands to displace the probe of the measurement equipment. It is a further aspect of the invention that a measurement equipment macro contains one or more commands to perform calculation and comparisons on the measurements obtained.

The method of the invention supports any macro format. The macro may be of a previous, current or future format. According to one aspect of the invention, the macro may be in the Dimensional Measuring Interface Standard (DMIS) format. The invention is not limited to the use of one macro; multiple macros may be used and executed consecutively or simultaneously.

According to one aspect of the invention, the numerical representation of the physical object is obtained by scanning part or all of the object using an object scanner. The scanning may be performed by any method or device, including some of the aforementioned measurement equipment—either manual, motorized or CNC—that has the capability of measuring the three-dimensional points of the surface of a physical object.

The scanning process results in a density of points that is a virtual representation of the physical part. 'Virtual' in the sense that the representation contains the contours, physical dimensions, features and details of the part. The degree of detail and accuracy at which the dimensions and contours are captured, depends on the accuracy and the resolution of the measurement equipment.

To further enhance to the virtual representation, the scanning software may optionally create triangles between adjacent points of the point cloud, resulting in a topologically representative model of the object that has increased apparent resolution. These triangles or meshes enable the user to investigate the part in between the points by interpolating on the triangles between the points. It is an embodiment that said enhancement of the virtual representation is performed by a method of the invention.

The numerical representation of an object, thus, enables a virtual representation of the object to be re-constructed therefrom, for example, as a point cloud, a triangulated mesh, a rendered object, a poly line object etc. It is an aspect of the invention that the numerical representation is a list of co-ordinates per se. It is another aspect of the invention that the numerical representation is a list of co-ordinates after a transformation has been applied thereto. The transformation may be symmetrical (ie. the numerical information may be fully restored by applying a second transformation) or asymmetrical (i.e. the numerical information may be restored almost completely by applying a second transformation; the degree to which the restored numerical information deviates from the original may optionally be determined by the user).

Another aspect of the invention is a method for evaluating a physical object using a numerical representation of the object and a macro, wherein the instructions of the macro have been created using said numerical representation of the physical object in place of the physical object. Said macro may be created by a user interacting with a virtual representation of the object and obtaining a set of macro instructions therefrom. The macro so created may be used in a method of the invention and/or may be used with measurement equipment capable of performing measurements of a physical object. It is another aspect of the invention that additional instructions may be added to an existing macro, said instructions created using a numerical representation of the physical object.

It is an aspect of the invention that the method does not perform every instruction of the measurement equipment macro as such; it performs those commands of the macro required for obtaining measurement data from a point cloud. For example, the method may not perform instructions of the macro to move a part of the measurement equipment (e.g. move a robot arm), accelerate or decelerate movements, set the sensitivity, illumination, safety parameters of the probe, provide commands to the operator (e.g. move the part) etc.

While measurement equipment would not be permitted to collide with the physical object, it is an aspect of the invention that translations through the virtual representation of the physical object are performed. Permitting translations through the virtual representation greatly speeds-up the measuring process since a direct path through the object may be taken, instead of around the object.

Where a measurement at a position on the virtual representation is requested by the macro, it is an aspect of the invention that the method renders the virtual representation more accurately at the requested position than elsewhere on the virtual representation. Since there is no necessity to render accurate measurements at any position other than that requested by the macro, the speed of measurement is enhanced. Methods to enhance or render more accurately a virtual representation are known in the art and described above; they include creating triangles or meshes between adjacent points of the point cloud.

An aspect of the invention is a device that is capable of performing a method of the invention.

An aspect of the invention is a computer program held on a computer readable medium that is capable of performing a method of the invention.

Another aspect of the invention is a computer program held on a computer readable medium that is capable of performing a method of the invention.

Another aspect of the invention is a computer program as described above further comprising the ability to display a user interface on a web browser of a remote computer connected to the Internet, said interface allowing a user to send a numerical representation of the physical object over the Internet to a method of the invention.

Another aspect of the invention is a computer program as described above further comprising the ability to display a user interface on a web browser of a remote computer connected to the Internet, said interface allowing a user to send a measurement equipment macro over the Internet to a method of the invention.

Another aspect of the invention is a computer program as described above further comprising the ability to display a user interface on a web browser of a remote computer connected to the Internet, said interface allowing a user to send the title of a measurement equipment macro or an indication thereof over the Internet to a method of the invention.

Another aspect of the invention is a computer program as described above further comprising the ability to display a user interface on a web browser of a remote computer connected to the Internet, said interface allowing a user to receive an evaluation report of a physical object generated by a method of the invention.

Another aspect of the invention is a computer program as described above further comprising the ability to display a pay-per-use interface on a web browser of a remote computer connected to the Internet. Said pay-per-use interface may indicate a billing amount to the remote computer user, relating to the number of evaluations performed. Said pay-per-use interface may request billing information of the remote computer user. Said pay-per-use interface may request and/or provide a username and password to the remote computer user, to enable a user to access an account for using a method of the invention.

It is an aspect of the invention that it is not limited to just to the evaluation of one physical object using one macro and one numerical representation of the object. The method may be scaled up to perform multiple evaluations upon multiple numerical representations of the object using multiple macros. Once in possession of the invention, the skilled artisan would have sufficient knowledge and learning to scale up the method and device of the present invention.

The invention allows the continuation of the use of equipment macros already present in the user's library, and frees the measurement equipment that measures the physical object for other uses.

The evaluation of the physical object using a machine macro and measurement equipment would normally require a specialized engineer.

A physical object may be scanned by a non-specialised technician since scanning is a routine and fast operation.

The time that would normally be spent by the specialized engineer in obtaining measurements from the physical object and in operating the measurement equipment may now be spent operating the method and device of the invention.

Since the invention does not require the measurement equipment, said equipment may be put to use to routinely scan several physical objects in the same time that it would take a specialized engineer to evaluate a single object.

The evaluation may be performed by a client, thus providing time and cost saving when the measurement equipment is associated with a remotely located manufacturer.

Through this invention these macro's can also be used in combination with point clouds generated by new non-contact measurement equipment. The large databases of measurement macro's generated on many industrial parts can still be used for quality control evaluation.

DETAILED DESCRIPTION OF THE FIGURES

Figure 1:
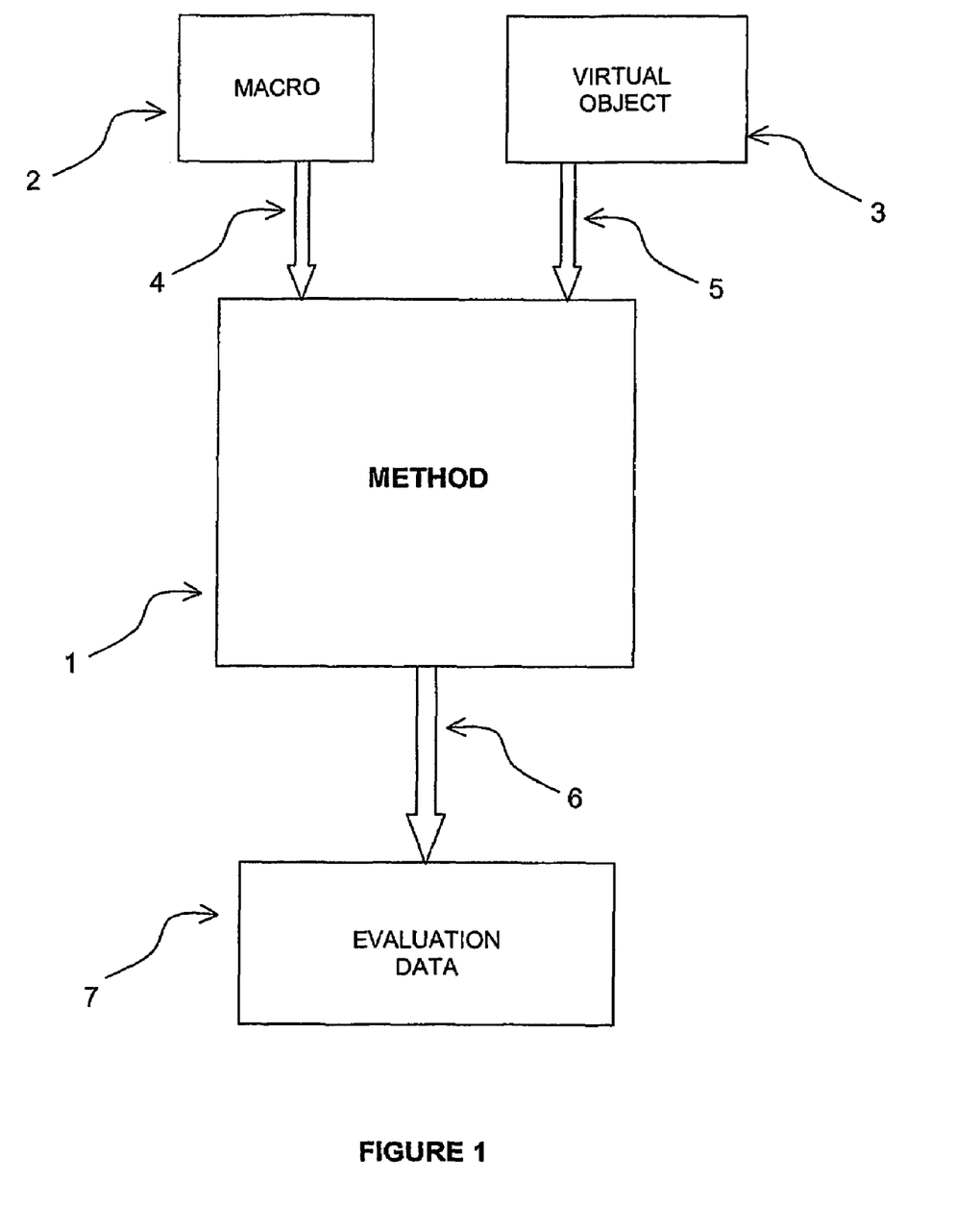
FIG. 1 a schematic representation of a method of the invention wherein a macro and a numerical representation of the object (virtual object) are inputted into a method of the invention, and evaluation data is the result of applying the method.

FIG. 1 depicts an embodiment of the invention showing a method of the invention 1, which reads and performs the instructions of a measurement equipment macro 2, and by applying it to a numerical representation of the object ("Virtual object") 3. Obtained from the method is evaluation data 7. Thus, the macro 2 and the virtual object 3 are input 4, 5, and the evaluation data 7, is output 7 of a method of the invention 1.

Figure 2:
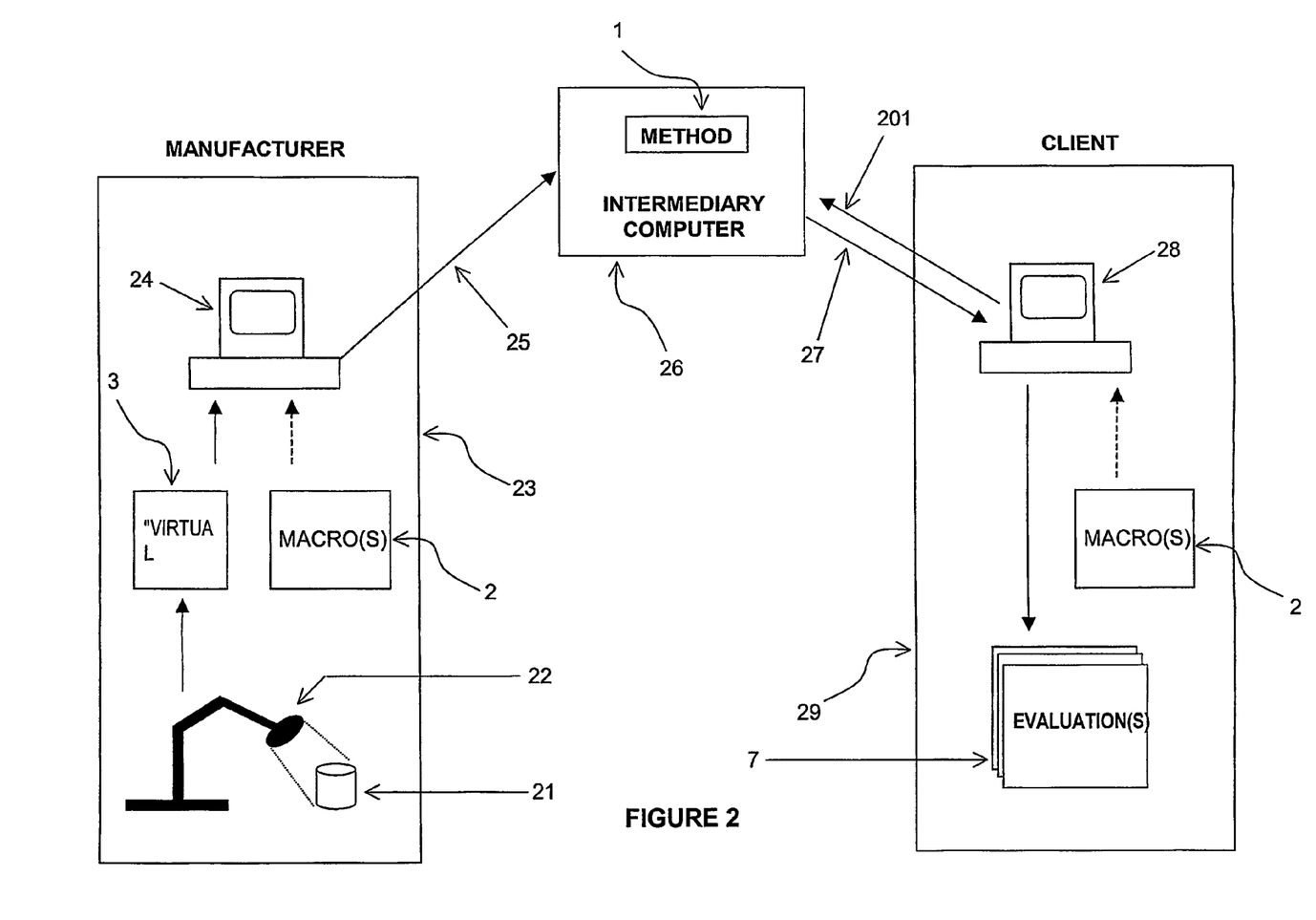
FIG. 2 a schematic representation of a method of the invention, wherein the method is held on an intermediary computer, and a numerical representation of the object is forwarded thereto from a remote computer. The evaluation is forwarded to another remote computer. This embodiment of the invention allows a part manufactured in a remote location to be scanned by the manufacturer and evaluated by the client at another remote location.

FIG. 2 is another embodiment of the invention depicting a situation where an evaluation report is required of an object that was scanned in a remote location. In this depiction, a manufacturer 23 has produced a physical object 21 and has scanned the object using a CMM 22. The numerical representation of the data ("Virtual object") 3, obtained therefrom is transferred 25 using a computer 24 connected to an intermediary computer 26 on which a computer program capable of performing a method of the invention is stored 1. The connection 25 may be across the Internet, across a local area network, across a telephone line, an ISDN connection or via any means of transferring data between two computers. One or more macros, or indications of the titles of one or more macros may optionally be communicated via the manufacturer's computer 24 to the intermediary computer 26. The intermediary computer 26 may be a web server, or any computer capable of communicating with remote computers. The intermediary computer 26 may embody a collection of interconnected separate physical computers which together perform the task of the intermediary computer 26. The intermediary computer executes the macro 2, if a macro 2 was provided by the manufacturer 23 upon the virtual object 3, and the evaluation data is held on the intermediary computer 26 for transmitting 27 to the computer of the client 28 from where it is made available to the client as a report or data 7. If no macro 2 was provided by the manufacturer 23, or if the client 29 wishes to use the method 1 with another macro 2, the client 29 may transmit 201 a macro 2 to the intermediary computer 26. The intermediary computer executes the method 1, using a macro 2 provided by the client 29 upon the virtual object 3. Again the evaluation data so produced is held on the intermediary computer 26 for transmitting 27 to the computer of the client 28 from where it is made available to the client as a report or data 7. It is an option of the invention that the numerical representation of the object is transmitted along the aforementioned communication path to the client. By performing a method by an intermediary computer, an anti-piracy protection of the method by the owner of the intermediary computer is provided, and the possibility of pay-per-use.

Figure 3:
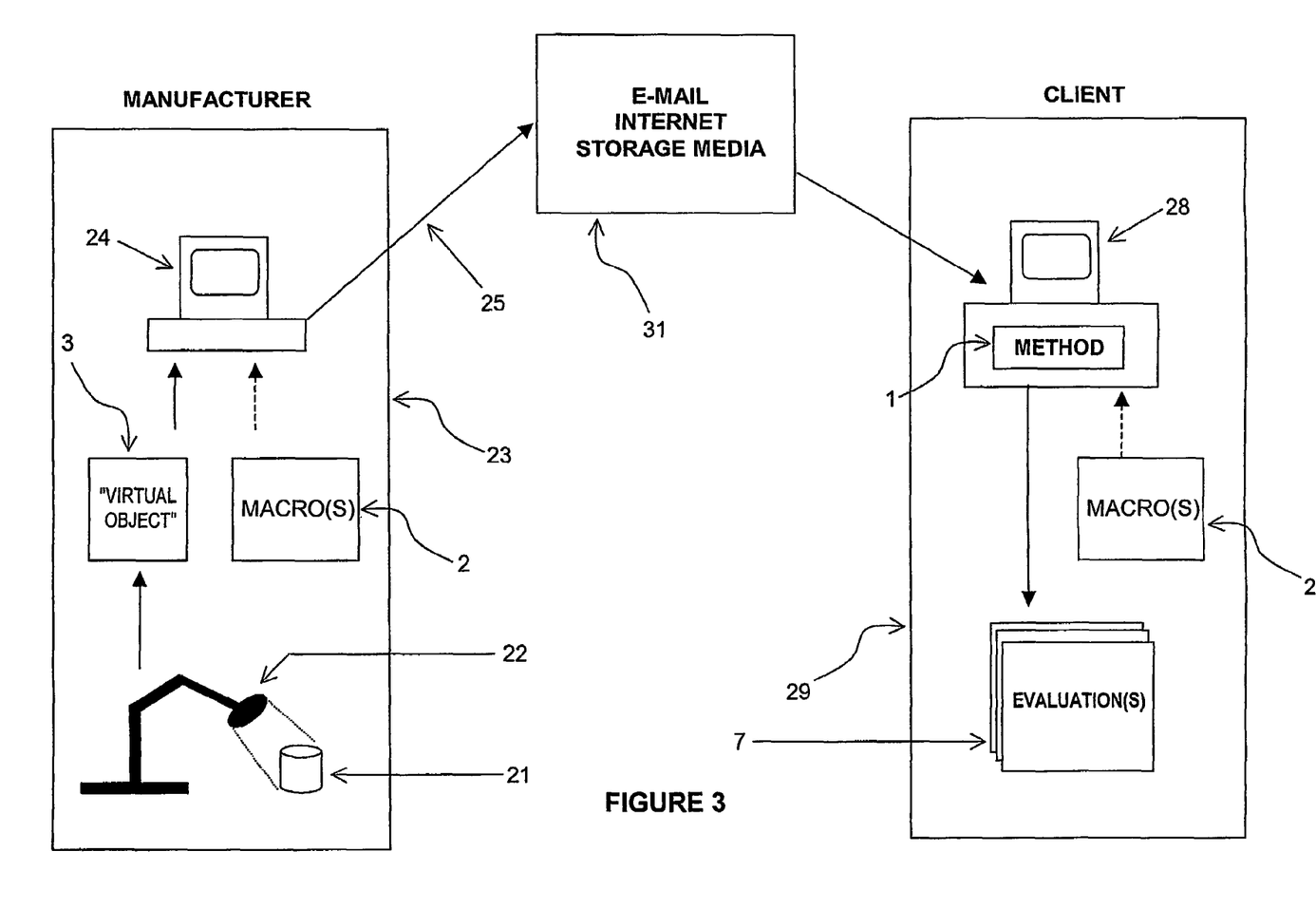
FIG. 3 a schematic representation of a method of the invention, wherein the method is held on a client's computer, and a numerical representation of the object is forwarded thereto from a computer of the manufacturer.

FIG. 3 is another embodiment of the invention depicting a situation where an evaluation report is required of an object that was scanned in a remote location. In this depiction, a manufacturer 23 has produced a physical object 21 and has scanned the object using a CMM 22. The numerical representation of the data ("Virtual object") 3, obtained therefrom is transferred 25 using a computer 24, to the computer of the client 28. The communication path 31 along which the virtual object 3 is transmitted may be via any means of transferring data between two computers including across the Internet, email, across a local area network, across a telephone line, an ISDN connection, radio link, cables or via physically removable storage media. One or more macros, or indications of the titles of one or more macros may optionally be communicated via the manufacturer's computer 24 to the clients computer 28. A computer program capable of performing a method of the invention 1 is held on the client's computer 28. The method 1 reads and performs the instructions of the macro 2, if a macro 2 was provided by the manufacturer 23 upon the virtual object 3, and the evaluation data 7 is provided by the method. If no macro 2 was provided by the manufacturer 23, or if the client 2 wishes to use the method 1 with another macro 2, the client may perform the method 1 using a macro held on the client's computer 28. Again the evaluation data so produced is made available to the client as a report or data 7. By remotely evaluating an object from a numerical representation of an object provided by the manufacturer allows faults, defects and other evaluation information to be detected by the client without the physical presence of the object. The object may thus remain in the factory until such a time as the evaluation has been carried out. Furthermore, there is no need for the client to possess expensive scanning equipment.

The invention claimed is:

1. A method of remotely evaluating a physical object, the method comprising:
    reading instructions of a macro at a local computer,
        wherein said macro is configured for use with a first measurement equipment, said first measurement equipment being capable of performing measurements of said physical object, and
        wherein said macro comprises instructions for said first measurement equipment to perform an evaluation of said physical object;
    receiving at the local computer a numerical representation of said physical object, wherein said numerical representation has been previously generated by measurement of said physical object using a second measurement equipment and prior to the numerical representation being sent to the local computer, and wherein the local computer is configured such that it is capable of evaluating said physical object by evaluating said numerical representation in lieu of evaluating said physical object;
    generating an evaluation of said physical object at said local computer by performing the instructions of said macro upon the numerical representation of the surface of said physical object; and
    outputting through the local computer said evaluation.

2. Method according to claim 1 wherein said numerical representation of the surface is obtained by scanning part or all of the physical object using an object scanner.

3. Method according to claim 1, wherein said numerical representation of the surface is any of point cloud data, triangulated mesh data, rendered surface data, and polyline data.

4. Method according to claim 1, wherein said first measurement equipment is a Coordinate Measuring Machine (CMM).

5. Method according to claim 1, wherein said macro comprises Dimensional Measuring Interface Standard (DMIS) commands.

6. Method according to claim 1, wherein said macro comprises CMM commands.

7. Method according to claim 1, further comprising communicating said evaluation by part of a DMIS-measurement program or by using DMIS commands format.

8. Method according to claim 1, further comprising communicating the said evaluation in the format of CMM measurement results.

9. Method according to claim 1, wherein the instructions of said macro that are performed relate to measurement of data from the numerical representation of the surface.

10. Method according to claim 1, further comprising performing translations through the surface of the object.

11. Method according to claim 1, wherein the macro comprises instructions for performing a measurement comprising:
(a) determining elements of data that numerically represent the object, and that correspond to the position on the physical object to be measured, without increasing the resolution by calculating the co-ordinates of any additional points;
(b) calculating additional points by interpolation of the determined elements, wherein the additional points increase the resolution in an area of a position to be measured; and
(c) calculating from the area of increased resolution a measurement of the object.

12. Method according to claim 1, wherein one or more instructions of said macro have been created by using said numerical representation of the physical object.

13. Method according to claim 12 wherein said instructions are recorded to the macro by way of a DMIS-measurement program or using the DMIS commands format.

14. Method according to claim 12, wherein said instructions are part of a measurement sequence generated by recording commands of a Coordinate Measuring Machine measurement program.

15. Method according to claim 12, wherein said instructions are part of a measurement sequence in a Coordinate Measuring Machine measurement program.

16. Method according to claim 1, wherein said evaluation comprises the execution of steps on a computer in an automatic way without interaction with the user of said computer during the execution of said steps.

17. The method of claim 1, wherein the output of the evaluation is a report.

18. The method of claim 1, wherein the evaluation comprises obtaining information regarding the shape of a portion or a feature of a physical object.

19. The method of claim 18, wherein the evaluation provides an assessment of the trueness of a feature of the physical object or a dimension of a physical object.

20. The method of claim 1, wherein the evaluation comprises a measurement.

21. The method according to claim 1, wherein the first measurement equipment and the second measurement equipment are different from one another and remote to the local computer.

22. The method according to claim 1, wherein the first measurement equipment and the second measurement equipment are the same measurement equipment that is remote to the local computer.

23. A method of remotely evaluating a physical object, the method comprising:
a local computer receiving a cloud of points from a remote location, wherein the cloud of points has been generated by a previous measurement of said physical object at the remote location and virtually represents said physical object;
performing an evaluation of the cloud of points at the local computer;
the local computer calculating one or more values based on the evaluation, wherein the one or more values approximate the value or values that would result from the measurement of said physical object by a measuring device; and
the local computer outputting the evaluation.

24. The method of claim 23, wherein the output of the evaluation is a report.

25. A method of remotely probing a physical object, the method comprising:
a local computer receiving a cloud of points from a remote location, wherein the cloud of points has been generated by previous measurement of said physical object at the remote location and virtually represents said physical object;
the local computer performing an evaluation of the cloud of points;
the local computer calculating or selecting a point that approximates a point that would result from the probing of a coordinate measuring machine (CMM) on said physical object; and
the local computer outputting the evaluation.

26. The method of claim 25, wherein the output of the evaluation is a report.

27. A computer readable medium comprising instructions which, when executed, cause the computer to perform the method according to claim 1.

28. A computer readable medium according to claim 27, further comprising instructions which, when executed cause the computer to receive the numerical representation of the physical object from a remote computer.

29. A computer readable medium according to claim 28 wherein the numerical representation is received from the remote computer across any of the Internet, email, wireless link, public switched telephone network, ISDN, satellite link, or by physical transport of a computer readable storage medium holding said numerical representation.

30. A computer readable medium according to claim 29 wherein said computer readable storage medium comprises any of optical disk, magnetic disk, optic-magnetic disk, magnetic tape.

31. A computer readable medium according to claim 27, further comprising instructions, which, when executed cause the computer to display a user interface on a web browser of a remote computer connected to the Internet, said interface allowing a user to send the numerical representation of the physical object over the Internet to a computer configured to perform said method.

32. A computer readable medium according to claim 27, further comprising instructions, which, when executed, cause the computer to display a user interface on a web browser of a remote computer connected to the Internet, said interface allowing a user to send said macro over the Internet to a computer configured to perform said method.

33. A computer readable medium according to claim 27, further comprising instructions, which, when executed, cause the computer to display a user interface on a web browser of a remote computer connected to the Internet, said interface allowing a user to send the title of said macro or an indication of said macro over the Internet to a computer configured to perform said method.

34. A computer readable medium according to claim 27, further comprising instructions, which, when executed, cause the computer to display a user interface on a web browser of a remote computer connected to the Internet, said interface allowing a user to receive an evaluation report of a physical object generated by said method.

35. A computer readable medium according to claim 27, further comprising instructions, which, when executed, cause the computer to display a pay-per-use interface on a web browser of a remote computer connected to the Internet, said pay-per-use interface configured to perform at least one of requesting a username and password to the remote computer user so as to enable a user to access an account for using the method, requesting billing information of the remote computer user, indicating a billing amount to the remote computer user, the billing amount relating to the number of evaluations performed, and providing a username and password to the remote computer user so as to enable a user to access an account for using the method.

36. A method of remotely evaluating a physical object, the method comprising:

reading instructions of a macro at a local computer, wherein said macro is configured for use with a first measurement equipment, and wherein said macro comprises instructions for said first measurement equipment to perform an evaluation of said physical object;

receiving a numerical representation of said physical object from a remote computer, wherein said numerical representation was generated with a second measurement equipment;

generating an evaluation of said physical object with said first measurement equipment by performing the instructions of said macro upon the stored numerical representation; and outputting said evaluation.

37. The method according to claim 36, wherein the first measurement equipment and the second measurement equipment are different from one another and remote to the local computer.

38. The method according to claim 36, wherein the first measurement equipment and the second measurement equipment are the same measurement equipment that is remote to the local computer.

39. A method of remotely evaluating a physical object, the method comprising:

reading instructions of a macro, said macro configured for use with first measurement equipment, said first measurement equipment being capable of performing measurements of said physical object, said macro comprising instructions for said first measurement equipment to perform an evaluation of said physical object;

receiving a numerical representation of said physical object from a remote computer, wherein said numerical representation was generated by measurement of said physical object using a second measurement equipment and prior to the numerical representation being sent from the remote computer to a local computer, and wherein the numerical representation is configured such that said physical object may be evaluated by evaluating said numerical representation;

generating an evaluation of said physical object by performing the instructions of said macro upon the numerical representation of said physical object, wherein the generating the evaluation comprises performing a single calculation on at least two points of the numerical representation; and outputting said evaluation.

40. The method according to claim 39, wherein the first measurement equipment and the second measurement equipment are different from one another.

41. The method according to claim 39, wherein the first measurement equipment and the second measurement equipment are the same measurement equipment.

* * * * *

UNITED STATES PATENT AND TRADEMARK OFFICE
CERTIFICATE OF CORRECTION

| | | |
|---|---|---|
| PATENT NO. | : 7,672,810 B2 | Page 1 of 1 |
| APPLICATION NO. | : 10/576223 | |
| DATED | : March 2, 2010 | |
| INVENTOR(S) | : Van Coppenolle et al. | |

It is certified that error appears in the above-identified patent and that said Letters Patent is hereby corrected as shown below:

The domestic priority is missing from the face of the patent. Please insert the following:

--This application claims benefit of 60/511,491, filed October 15, 2003.--

Signed and Sealed this

Seventeenth Day of August, 2010

David J. Kappos
*Director of the United States Patent and Trademark Office*